United States Patent [19]

Zeliger

[11] 4,197,227
[45] Apr. 8, 1980

[54] WEAR-RESISTANT PAINT

[76] Inventor: Harold I. Zeliger, 18 Spring Hill Ter., Spring Valley, N.Y. 10977

[21] Appl. No.: 849,312

[22] Filed: Nov. 7, 1977

[51] Int. Cl.² ............................................. C08L 93/00
[52] U.S. Cl. ............................... 260/27 R; 260/23 R; 260/23 AR; 260/23 XA; 260/23 S; 260/23 H; 260/27 EV; 260/28.5 AV; 260/31.8 G; 260/31.8 H; 427/137; 525/297; 525/300; 525/302
[58] Field of Search .................. 260/23, 23 R, 23 AR, 260/23 XA, 23 S, 23 H, 873, 27 EV, 28.5 AV, 897 B, 31.8 G, 31.8 H, 27 R; 427/137

[56] References Cited

U.S. PATENT DOCUMENTS

| | | | |
|---|---|---|---|
| 2,485,248 | 10/1949 | Watson et al. | 260/27 EV |
| 2,567,719 | 9/1951 | Loritsch et al. | 260/28.5 D |
| 3,303,160 | 2/1967 | Remer | 260/33.4 |
| 3,331,796 | 7/1967 | Gilbert, Jr. et al. | 260/28.5 R |
| 3,615,106 | 10/1971 | Flanagan et al. | 260/23 H |
| 3,691,120 | 9/1972 | Susuki et al. | 260/28.5 AV |
| 3,896,069 | 7/1975 | Kosaka et al. | 260/897 B |
| 4,041,002 | 8/1977 | Aboshi et al. | 260/31.6 |

FOREIGN PATENT DOCUMENTS

| | | | |
|---|---|---|---|
| 140124 | 7/1948 | Australia | 260/27 EV |
| 2268113 | 12/1975 | France | 260/28.5 AV |

*Primary Examiner*—Melvyn I. Marquis
*Attorney, Agent, or Firm*—Marvin Feldman; Stephen E. Feldman

[57] ABSTRACT

A paint composition is disclosed which comprises:
(a) a highly flexible polymer such as an ethylene-vinyl acetate copolymer;
(b) a compound having a plurality of aliphatic double bonds such as a polyterpene;
(c) a plasticizer-tackifier such as a phthalate wherein (a), (b) and (c) comprises the binder; and
(d) a liquid carrier such as an organic solvent for the binder; and
(e) a pigment such as titanium dioxide, dispersible in the carrier.

This composition when applied to asphalt or concrete surfaces dries under ambient conditions to set without the application of heat, and the dried paint composition exhibits a high degree of wear resistance under outdoor abrasive and erosive exposure.

18 Claims, No Drawings

WEAR-RESISTANT PAINT

FIELD OF USE OF THE INVENTION

This invention relates to paint compositions. Specifically, this invention relates to a paint composition for outdoor surfaces which exhibits wear-resistance to abrasive and erosive activity.

DISCUSSION OF THE PRIOR ART

Heretofore the prior art was directed to the use of hard non-deformable paints and coatings such as the alkyd-based type, for applications to road and street surfaces. Such paints when applied would require a relatively substantial cure period before use.

Further, such prior art paints would be subject to obliteration through exposure to the abrasive and erosive environment.

Typical of such prior art alkyd-based coatings are those disclosed in Loritch, et al U.S. Pat. No. 2,567,719, granted Sept. 11, 1951 and Gilbert, U.S. Pat. No. 3,331,796, granted July 18, 1967.

The use of other cure-type polymeric compositions is disclosed in Flanagan et al, U.S. Pat. No. 3,615,106, granted Oct. 26, 1971.

Flanagan is of interest in that while it discloses a hot melt wax composition which must be heated to cure set, the combination of ingredients in Flanagan includes an ethylenevinyl acetate copolymer; a tackifying resin such as a polyterpene, polyethylene waxes and a number of oils. While Flanagan mentions fillers in a peripheral sense there is no discussion of paints.

The use of non-cure resin systems are typically disclosed in the Aboshi et al and Remer patents as discussed hereinbelow.

Aboshi et al U.S. Pat. No. 4,041,002, granted Aug. 9, 1977, discusses a thermoplastic molding resin, which combines a base resin, a lubricant and an ethylene-vinyl acetate copolymer.

Remer U.S. Pat. No. 3,303,160, granted Feb. 7, 1967 is directed to an ink composition which combines certain polymers with a plasticizer, a solvent and a pigment. Remer only incidentally includes compounds which have aliphatic double bonds, and often the base resin is present in rather limited quantities. Remer does not disclose paint applications.

While Remer and to some degree Flanagan employ some of the components useful in the composition of the present invention, there is no recognition in the prior art to provide the present composition as a high flexible, air dry, wear-resistant paint for outdoor surfaces.

Now there is provided by the present invention a paint composition which may be readily applied to asphalt or concrete surface, and is air-dried to set, and is highly wear-resistant.

It is therefore an object of this invention to provide a paint composition which is highly wear-resistant in use on asphalt, concrete and like surfaces.

It is another object of this invention to provide a paint composition as aforesaid which does not require heat cure and is set for use by drying under normal ambient conditions.

It is still another object of this invention to provide a paint composition as aforesaid which is highly flexible and resists the abrasive and erosive environments of road use.

It is also an object of this invention to provide a paint composition as aforesaid, when air-dried, exhibits a high degree of flexibility and elongation.

It is still a further object of this invention to provide a paint coated carbonaceouser siliceous surface which shows improved wear-resistance over present paint coated surfaces.

It is still a further object of this invention to provide a paint which is readily manufactured, readily applicable to surfaces and yet is safe and practical in use.

The aforesaid objections as well as others will be made apparent from a reading of this specification and the adjoined claims.

DESCRIPTION OF THE PREFERRED EMBODIMENTS

By the term "flexible" as used hereinbefore and hereinafter, it is meant the properties of flexure in the sense of bending and elongation. In the context of the base polymer of the binder, the term "flexible" means that base polymer strips of 0.10 inch will flex through angle of at least 45° and usually up to 180° or more, and the elongation of the strip is 100 to 1400%. In the context of the dried paint, the term flexible means that a paint strip of 0.10 inch will flex through an angle of 25°, and usually 45° to 180°, and exhibit an elongation of 100% to 400%.

In one broad aspect, the present invention is a wear-resistant composition useful on an asphalt, cement or stone surface, which composition comprises:
(a) a flexible polymer;
(b) a compound having a plurality of aliphatic double bonds;
(c) a plasticizer-tackifier; said
(d) a liquid carrier for said (a), (b) and (c); said liquid being vaporizable in air at temperature in excess of about 0° C.; and
(e) a pigment which is dispersible in said liquid.

In another aspect, the present invention may be said to be in combination;
a base being one selected from the group asphalt, cement and stone; and
a paint coating applied to one surface of said base, said paint coating comprising:
(a) a flexible polymer;
(b) a compound having a plurality of aliphatic double bonds;
(c) a plasticizer-tackifier;
(d) a liquid carrier for said (a), (b) and (c); said liquid being vaporizable in air at temperature in excess of about 0° C.; and
(e) a pigment which is dispersible in said liquid.

The weight of components of the composition of this invention are typically as follows:

| Binder: | % by weight of binder | |
| --- | --- | --- |
|  | range | preferred |
| flexible polymer | 33–75 | 65 |
| aliphatic double bond compound | 10–50 | 30 |
| plasticizer-tackifier | 1–15 | 5 |

| Total Composition: | % by weight | |
| --- | --- | --- |
|  | range | preferred |
| Binder | 10–50 | 20 |
| Solvent | 50–90 | 68 |
| Pigment | 2–20 | 12 |

Where desired, the flexible polymer may be present in an amount of from about 33% to 90% by weight of said binder.

Flexible polymers useful pursuant to the present invention include a broad range of materials.

Exemplary of such flexible polymers are the polymers and copolymers of following monomers; ethylenically unsaturated aromatic compounds such as styrene, alpha-methyl, styrene, ortho-, meta-, and para-substituted alkyl styrene, e.g., orthomethyl styrene, orthoethyl styrene, para-methyl styrene, para-ethyl styrene, ortho-, meta-, or para-butyl styrene, ortho-, meta-, or para-butyl styrene, ortho-, meta-, or para-secondary butyl styrene, ortho-, meta-, or para-tertiary butyl styrene, etc., alpha-halogenated styrene, e.g., alpha-chlorostyrene, alpha-bromo-styrene, ring-substituted halogenated styrenes, e.g., ortho-chlorostyrene, para-chlorostyrene and the like; esters of ethylenically unsaturated carboxylic acids e.g., methyl acrylate, methyl methacrylate, ethyl methacrylate, ethyl acrylate, butyl-acrylate, propyl acrylate, butyl methacrylate glycidol acrylate, glycidol methacrylate, and the like, ethylenically unsaturated acids, carboxylic acids such as acrylic acid, methacrylic acid, propacrylic acid, crotonic acid, and the like; vinyl esters, e.g. vinyl formate, vinyl acetate, vinyl proprionate, vinyl butyrate, etc.; vinyl and vinylidene halides, e.g., vinyl chloride, vinyl bromides, vinylidene chloride, vinyl fluorides, etc.; vinyl ethers, e.g., methyl vinyl ether, ethyl vinyl ether, propyl vinyl ether, alphaolefins, e.g., ethylene, propylene, butene, pentene, hexene, heptene, octene, isobutene and other isomers of the foregoing.

The most preferred flexible polymers are the ethylene-vinyl acetate copolymers, particularly those having a vinyl acetate content of from 15 to 40%.

The flexible polymer will generally have a molecular weight of from 20,000 to about 400,000 and most preferably 40,000 to about 250,000.

Suitable aliphatic double-bonded compounds useful pursuant to the present invention includes the terpenes, e.g., polyterpenes; polyketones; polyesters; tall oils, e.g., tall oil rosins; dienes, e.g., butadienes, and other similary highly unsaturated materials.

The plasticizers which may be used are well known in the art and include among others, for instance, tricresyl phosphate, dibutyl phthalate, dioctyl phthalate, polycarboxylic acid polyesters of a nuclearly halogenated aryl ether alcohol, for instance, di-(para-chlorophenylethyl) sebacate, etc.; butyl phthalyl butyl glycolate, dioctyl sebacate, di-(2-ethylhexyl) tetrachlorophthalate, ethylene, glycol dioleate, polyester plasticizers, e.g., the Paraplexes, etc.

The plasticizer is usually added to the binder before the addition of any solvent of pigment.

It is also within the contemplation of this ivention to provide modest quantities of a wax in the binder; such quantities usually about 1 to 15% by weight of the binder and about 1 to 10% by weight of the paint.

Suitable colorants, particularly pigments, useful pursuant to the present invention include all the well known pigments useful in the paint art. Exemplary of such materials are carbon blacks, ochre yellows, and most preferably the white materials such as useful in marking streets, including rutile titanium dioxide, anatase titanium dioxide, zinc sulfide, basic lead carbonate, lead sulfate, calcium carbonate, and the like.

By the term "wax" it is meant any material exhibiting wax-like characteristics, and usually having a molecular weight of from 1,000 to 5,000. Suitable waxes include the animal; vegetable; mineral, e.g., paraffin, petrolatums and the like; and the synthetics, e.g., polyethylenes, polyoxyethylene esters, and the like.

The liquid carrier pursuant to the present invention includes both the organic solvents for the binder as well as aqueous dispersing media. Emulsions and dispersions as well as pure solutions are within the contemplation of this invention.

Typical organic solvents useful in the present invention include toluene, xylene, benzene, halogenated hydrocarbons, e.g., perchlorpethane, 1,1,1-trichloroethylene and the like; naphthas; and the like.

It is also within the contemplation of this invention to add other materials such as anti-oxidants, optical brighteners, and fillers in amounts known to the practitioner in the art.

EXAMPLE I

The following binder composition was mixed:

| Binder component | % by weight |
|---|---|
| ELVAX 150[1] | 50% |
| AC-400[2] | 15% |
| Ketone-N[3] | 30% |
| Cellolyn-21[4] | 5% |

[1] ethylene-vinyl acetate copolymer; Dupont Chemical Corp., Wilmington, Del.
[2] ethylene-vinyl acetate copolymer; Allied Chemical Corp., Morristown, N.J.
[3] polyketone; BASF - Wyandotte Chemical Corp.
[4] phthalate ester; Hercules Chemical Corp., Wilmington, Del.

The above binder was dissolved in a solvent of 1:1 by weight NMP naphtha:toluene; with $TiO_2$ pigment dispersed therein, by the action of continuous shear blending until solution and dispersion was complete.

The final composition was:

| Binder | 18% |
|---|---|
| Solvent | 70% |
| Pigment | 12% |

The composition was spread onto a asphalt street surface in everyday use, and after 5 years of such use still appears visible to the naked eye.

EXAMPLE II

The composition of Example I was spread on an asphalt surface next to a fresh prior art alkyd-based paint. After 1½ years, the alkyd paint was obliterated while after 3 years the paint composition of Example I remains intact.

EXAMPLE III

The paint composition of Example I was applied to a outdoor cement surface, and after 5½ years is still visible to the naked eye.

EXAMPLE IV

The composition of Example I was modified by the addition of 10% wax to the composition, and there was no pigment present, and the composition of Example IV was applied to a concrete surface after 5 years, the paint is still visible to the naked eye.

Surfaces other than asphalt, cement or stone or combinations thereof (e.g., concrete) may serve as the substrate. Broadly, all carbonaceous and siliceous substrates may be painted.

The paint composition of the present invention may also be employed on indoor as well as outdoor surfaces, and it is also within the contemplation of this invention to apply the paint composition to surfaces other than those as aforesaid, particularly such other surfaces being, glass, metal, wood and plastic.

In view of the teaching contained in the foregoing examples, those skilled in the art will be able to make and use either the compositions specifically disclosed herein or such modified formulations as may be required for their needs without departing from the spirit and scope of the present invention.

What is claimed is:

1. A wear-resistant paint composition useful on an asphalt, cement or stone surface, which composition comprises:
   (a) a polymer;
   (b) a compound having a plurality of aliphatic double bonds;
   (c) a plasticizer;
   (d) a liquid carrier for said (a), (b) and (c); said liquid being vaporizable in air at a temperature in excess of about 0° C.; and
   (e) a pigment which is dispersible in said liquid and wherein said paint composition when air dried to a 0.10 inch strip, said strip exhibits a flexibility from about 45° to 180° in bending, which does not require heat cure.

2. The paint composition of claim 1, said (a), (b) and (c) comprising the binder and said flexible polymer being present in an amount of from about 33% to 90% by weight of said binder.

3. The composition of claim 1, said (a), (b) and (c) comprising the binder, and said flexible polymer being present in an amount of 50% to 90% by weight of said binder.

4. The composition of claim 2, said flexible polymer being an ethylene-vinyl acetate copolymer.

5. The composition of claim 4, said ethylene-vinyl acetate copolymer having from about 15% to 40% by weight of vinyl acetate.

6. The composition of claim 1, said compound (b) being one selected from the group polyketones, polyterpenes, tall oils and polyesters.

7. The composition of claim 1, said liquid carrier being an organic solvent for said (a), (b) and (c).

8. A paint composition comprising: a binder comprising;
   (a) 33% to 75% by weight of said binder, a polymer;
   (b) 10% to 50% by weight of said binder, a compound having a plurality of aliphatic double bonds; and
   (c) 1 to 15% by weight of said binder, a plasticizer; and an air-drying liquid-carrier for said binder; and a pigment dispersible in said liquid, whereby said composition upon drying forms a paint, so that when air dried to a 0.10 inch strip, said strip exhibits a flexibility from about 45° to 180° in bending, which does not require a heat cure.

9. The composition of claim 8, said binder being present in an amount of from 10 to 50% by weight of the composition;
   said liquid being present in an amount of from about 50 to 90% by weight of the composition; and said pgiment being present in an amount of from about 2 to 20% by weight of the composition.

10. The composition of claim 8, said paint composition when dried to 0.10 strip, said strip exhibits an elongation from about 100% to 400%.

11. The composition of claim 8, said flexible polymer being an ethylene-vinyl acetate copolymer.

12. The composition of claim 8, said compound (b) being one selected from the group polyketones, polyterpenes, tall oils and polyesters.

13. The composition of claim 8, further comprising a wax.

14. The composition of claim 13, said wax being from 1 to 10% by weight of the binder.

15. The composition of claim 9, said liquid being a solvent for said binder.

16. The composition of claim 8, said polymer has a molecular weight of from 20,000 to 250,000.

17. A wear-resistant paint composition useful on an asphalt, cement or stone surface, which composition comprises:
   (a) an ethylene-vinyl acetate copolymer;
   (b) a compound having a plurality of aliphatic double bonds;
   (c) a plasticizer;
   (d) a liquid carrier for said (a), (b) and (c); said liquid being vaporizable in air at a temperature in excess of about 0° C.; and
   (e) a pigment which is dispersible in said liquid.

18. The wear-resistant paint of claim 17, wherein said composition resists abrasive and erosive wear on an outdoor surface subject to wear so as not to be obliterated after a wear period in excess of 1½ years after application to said outdoor surface.

* * * * *